Aug. 8, 1961 E. J. ERWINSKI 2,995,006
INTERNAL COMBUSTION ENGINE AND PRESSURIZED HYDRAULIC
PUMP AND TURBINE TRANSMISSION SYSTEM
Filed Sept. 10, 1958 3 Sheets-Sheet 1
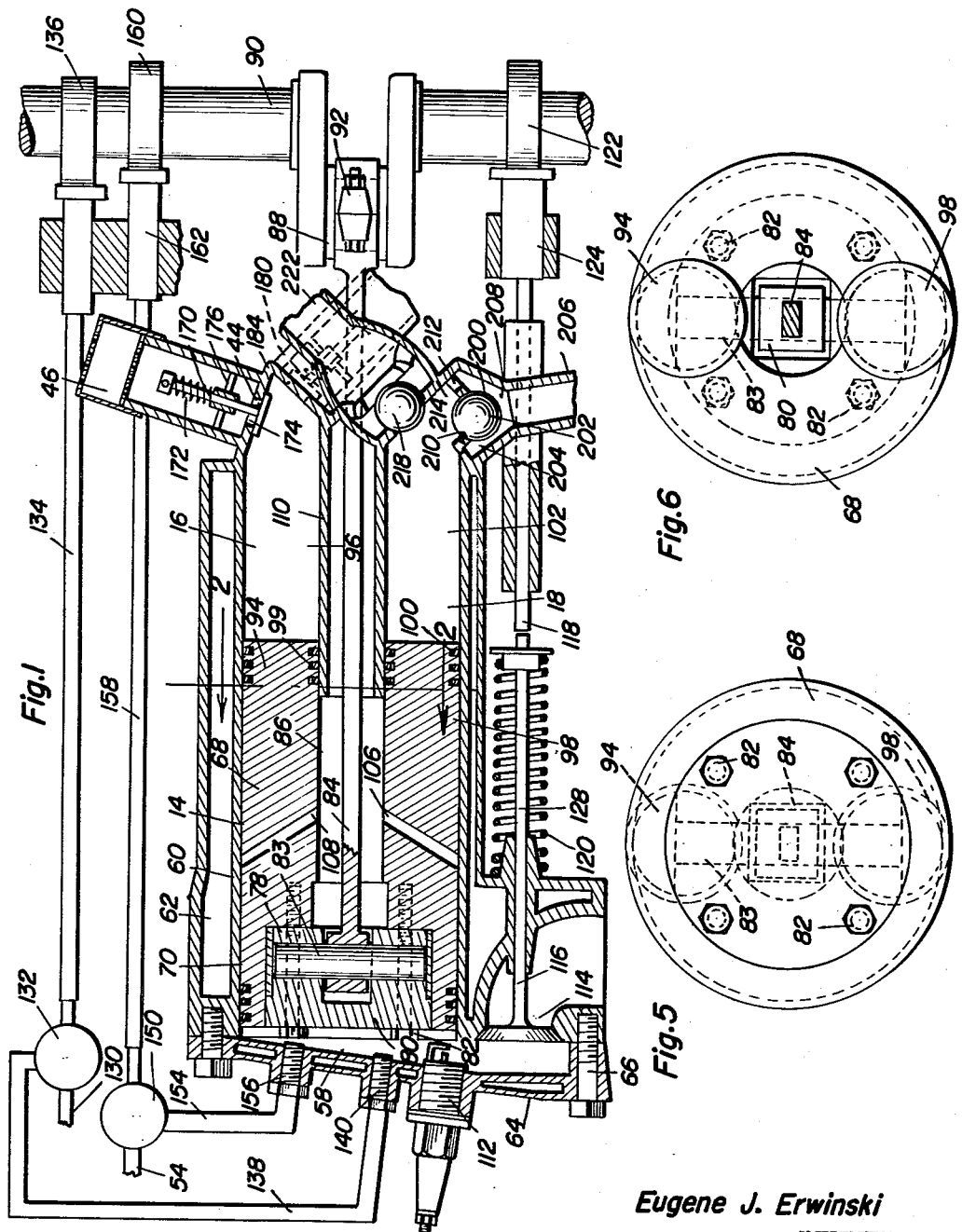
Eugene J. Erwinski
INVENTOR.

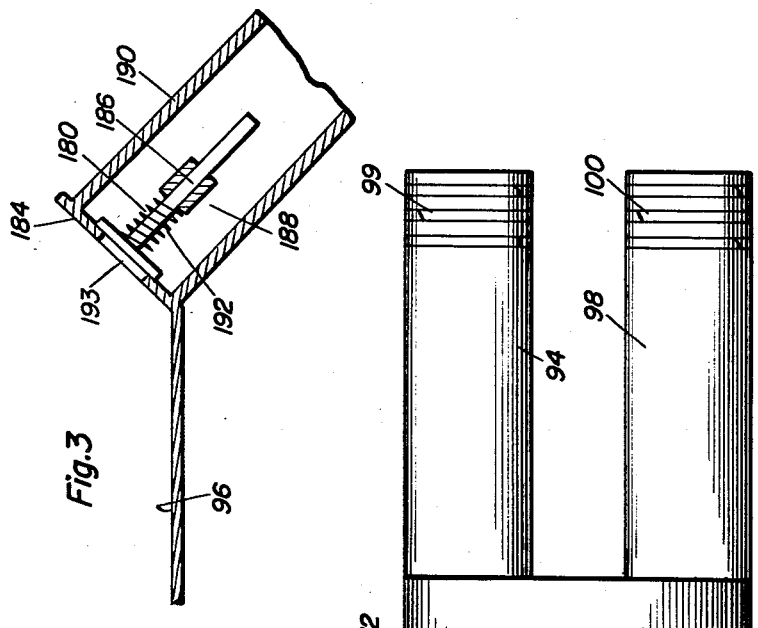
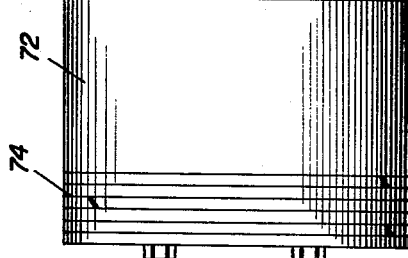
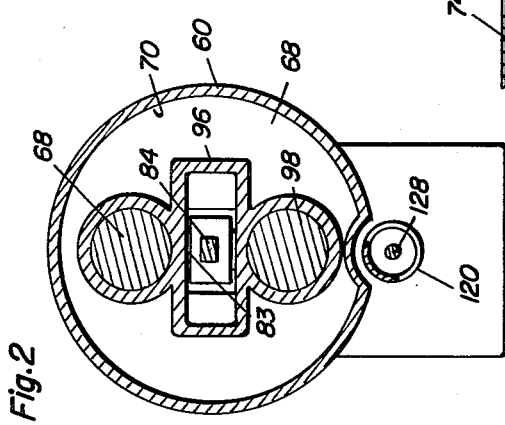
Eugene J. Erwinski
INVENTOR.

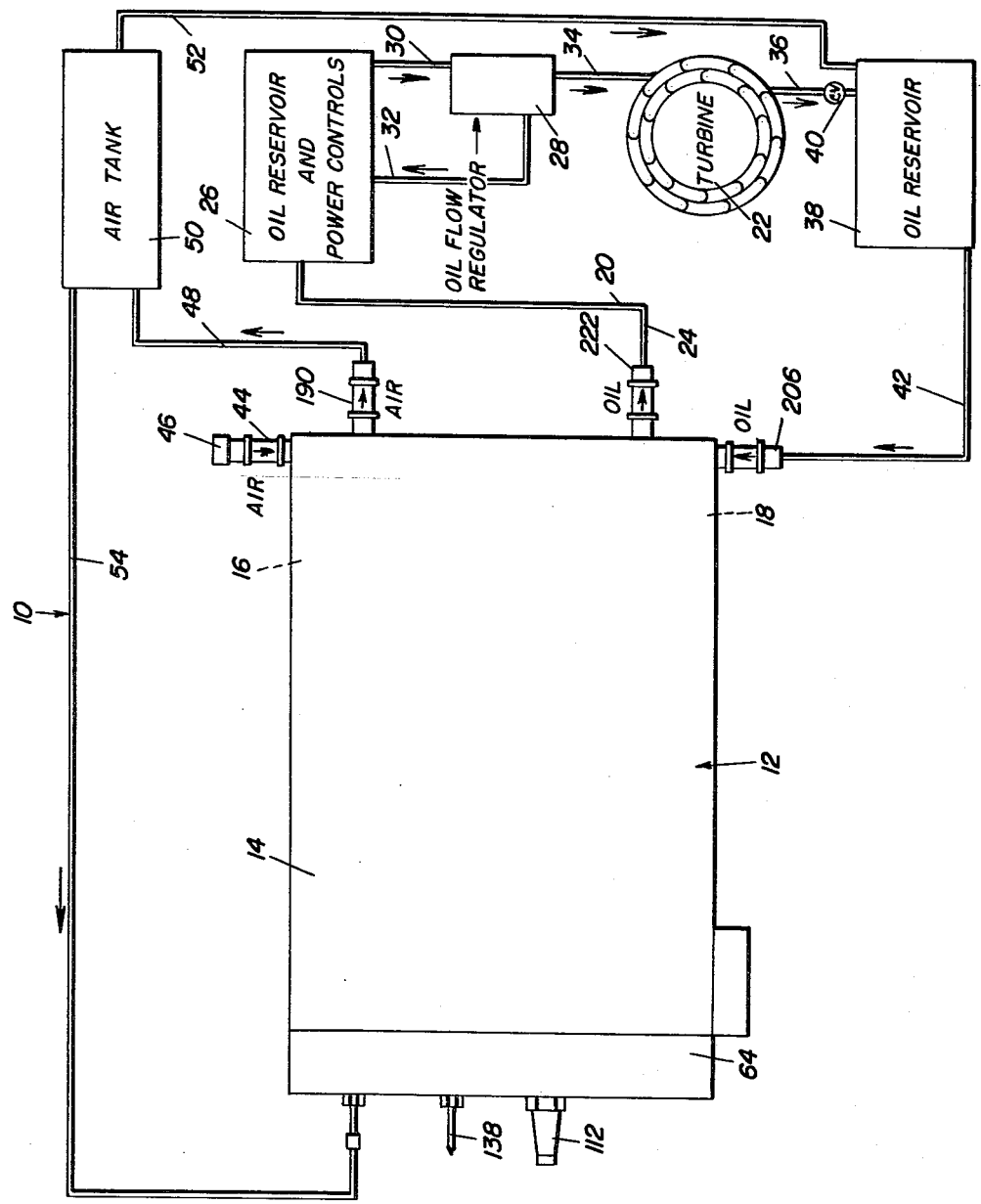

2,995,006
Patented Aug. 8, 1961

2,995,006
INTERNAL COMBUSTION ENGINE AND PRESSURIZED HYDRAULIC PUMP AND TURBINE TRANSMISSION SYSTEM
Eugene J. Erwinski, Jersey City, N.J.
(80 Willow Ave., Iselin, N.J.)
Filed Sept. 10, 1958, Ser. No. 760,144
3 Claims. (Cl. 60—12)

This invention relates to power plants and systems and more particularly to a power plant which entails an internal combustion engine of special construction combined with a closed circuit hydraulic or oil flow system from which power may be taken off together with an air pressure system which aids in pressurizing the hydraulic closed circuit and which is used to supply the combustion chamber of the internal combustion engine with air to support combustion.

The object of this invention is to provide a power plant and power plant system for driving a power consuming device by means of fluid, preferably oil, under pressure in a closed circuit with a pressure application from a novel internal combustion engine-pump-compressor assembly. The fluid pressure is enhanced by the application of air under pressure from the pump section of the power plant, and this power plant has its compressor arranged to deliver air under pressure to the internal combustion engine combustion chamber whereby the internal combustion engine has air supplied to support combustion or at least, supercharging air supplied in addition to other means for inducting air.

One of the important features of the power plant is the engine which has a block in which a power or main piston is operable to provide power strokes for the air compressor and oil pump, each of which has its cylinder barrel fixed with the engine block. For each stroke of the main piston in the internal combustion engine there is a corresponding stroke of the compressor piston and of the oil pump piston. The oil pump, constituting a part of the closed circuit for the power consuming device, maintains fluid under pressure in the closed circuit with this pressure enhanced by air under the air compressor output capability of the compressor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view of the internal combustion engine of the power plant and system, parts of the engine shown diagrammatically.

FIGURE 2 is a cross sectional view taken on the line 2—2 of FIGURE 1.

FIGURE 3 is an enlarged sectional view showing the air outlet valve of the air compressor, this valve being obscure in FIGURE 1.

FIGURE 4 is an elevational view of the main piston and compressor and pump pistons of the power plant.

FIGURE 5 is a view of the engine piston as it would appear at the main piston end.

FIGURE 6 is a view of the piston from the opposite end.

FIGURE 7 is a diagrammatic view showing the preferred system of which the engine in FIGURE 1 constitutes a part.

In the accompanying drawings reference is made first to the diagrammatic view in FIGURE 7. The entire system 10 has a power plant 12 which constitutes an important part thereof. The power plant will be described in detail subsequently. The power plant includes internal combustion engine 14 together with an air compressor 16 and an oil pump 18. When the reciprocating internal combustion engine 14 is operated, the pump and compressor are simultaneously actuated.

A closed hydraulic circuit 20 is connected with pump 16 and includes a power consuming device 22, for instance a turbine to which a load may be connected. Therefore the power consuming device functions as a power take-off to operate a shaft or some other structural element that is connected with a machine, an automobile axle or any other ultimate user of the power. Closed hydraulic circuit 20 is represented by oil conductor 24 attached to the outlet port of the pump 18, and the oil conductor is attached to an oil supply reservoir 26. Oil flow regulator 28 has a conductor 30 connected with it to receive oil from the reservoir 26, and an oil conductor 32 that functions as a return line, extending between the oil flow regulator 28 and the reservoir 26. Oil conductor 34 is attached to the oil flow regulator 28 and to the inlet of the power consuming device and conducted by pipe or some other type of conductor 36 to the oil supply reservoir 38, flowing preferably through check valve 40. The final conductor 42 of the closed hydraulic circuit, is connected to the reservoir 38 and to the inlet port of pump 18.

Air compressor 16 has an air inlet port with which inlet pipe 44 is registered, the inlet pipe having an air filter 46 at the open end thereof. The air outlet of the compressor has an air conductor 48 attached to it, the air conductor extending to an air pressure tank 50. Air pressure line 52 extends from the air pressure tank to the oil supply reservoir 38 in order to apply air pressure to the oil in the hydraulic circuit 20. Air conductor 54 extends from the air tank 50 and is operatively connected to the combustion chamber 58 of internal combustion engine 14. In operation of the system, engine 14 is started, and this causes the air compressor and the pump to operate simultaneously. The pump supplies oil under pressure to the power consuming turbine 22 by pumping oil through the closed circuit 20. At the same time air under pressure is applied through conductors 48 and 52 and the storage tank 50, to the closed hydraulic circuit to relieve the back pressure of the power consuming turbine 22. At the same time air under pressure is applied to the combustion chamber 58 of the internal combustion engine 14 from tank 50 through conductor 54 and the valve which is described subsequently.

Reference is now made to FIGURE 1 which illustrates the power plant 12. The power plant has the three basic units namely, the internal combustion engine 14, the air compressor 16 and the oil pump 18 in one unit. Engine, compressor and pump block 60 may be cast or built up of separate castings. In either case it is preferred that the block have a water jacket 62 with a water inlet and outlet (not shown) for maintaining the engine, compressor and oil pump at safe operating temperature levels. One end of the block has head 64, also water cooled, attached by bolts 66 at the combustion chamber 58 end. Main piston 68 (FIGS. 1–6) is mounted for reciprocation in bore 70. Main piston 68 has a piston head 72 with piston rings 74, and an outwardly opening recess 78 in which block 80 is located. The block is attached by bolts 82 in the recess 78 and supports wristpin 83 on which one end of connecting rod 84 is pivoted. The connecting rod extends through a central passage 86 in the piston 68 and is attached to the throw 88 of crankshaft 90 by a conventional connecting rod bearing 92.

Air compressor piston 94 is fixed to the main piston of the internal combustion engine and is operable in a cylinder barrel 96 that may be cast integral or separate and attached to the engine block within the confines of water jacket 72. Oil pump piston 98 is similarly attached to the main piston 68, and the compressor piston together with the oil piston each have piston rings 99 and 100 respectively thereon with rings 99 wiping against the wall of barrel 96 and the rings 100 wiping against the wall of barrel 102. The barrel 102 is the oil pump cylinder and is constructed the same as barrel 96. It is now evident that the three pistons 68, 94 and 98 operate simultaneously. The pistons and surfaces against which the rings thereof slide are lubricated by oil passing through oil passages 106 and 108 that extend from the hollow part or passages 96 in the piston which slides on sleeve 110 that constitutes part of the block. The sleeve is elongate, having a longitudinal axis on the longitudinal center line of the piston. Sleeve 110 and passage 86 constitute part of the crankcase of the engine and is filled with oil.

The internal combustion engine 14 of the power plant 12 is adapted to operate on hydrocarbonaceous fuel and is preferably, but not necessarily, ignition fired with spark plug 112 schematically representing a conventional ignition system. The plug is carried by head 64. Exhaust gases are passed through exhaust port 114 controlled by valve 116, the latter being a conventional exhaust valve operated by push rod 118 and pressed by spring 120 in the closed position. The valve is opened by cam 122 on crankshaft 90 operating through push rod 118, a valve lifter 124 and guide for the push rod and valve lifter. As the cam 124 is rotated with the crankshaft, the valve actuation train causes the valve stem 128 to be moved in a valve opening position against the yielding opposition of spring 124. As the crankshaft continues to rotate, spring 120 returns valve 116 to the closed position whereby exhaust gases are periodically discharged from the combustion chamber 58 in proper timed sequence with the engine operation.

Fuel is admitted to the combustion chamber in any conventional manner, although a fuel injection or pressure system is preferred. FIGURE 1 has such a system schematically shown. Fuel under pressure enters through fuel pipe 130 and is accepted by valve 132 controlled in timed sequence with the operation of the engine. Push rod 134 having one end of contact with the valve operator of valve 132 and having the other end in contact with crankshaft supported cam 136, illustrates the opening and closing of valve 132 in proper time with the engine operation. Fuel conductor 138 extends from valve 132 and is connected by fitting 140 with the head of the engine 14. The fitting registers with the combustion chamber 58. In place of fitting 140, a valve type fuel injector may be substituted.

Air may be admitted to the combustion chamber in several ways. One manner would be to have a valve controlled air manifold with the valve thereof functioning to admit air very much like a throttle valve in an ordinary motor vehicle internal combustion engine. In that case the compressed air from air conductor 54 would be used to supercharge the engine. As an alternative, and as illustrated, the primary air may be taken from air conductor 54 and fed directly into the combustion chamber. The air would, of course, have to be applied in charges regulated in accordance with the engine operation. This being the case, there is an air control valve 150 to which air conductor 54 is secured (FIG. 1). An additional air conductor 154 extends from valve 150 and is attached to the head 64 by fitting 156. The fitting conducts the air under pressure into the combustion chamber 58 in order to support engine combustion. Valve 150 is actuated in timed sequence with the engine by push rod 158 which is in contact with the valve operator. Cam 160 is secured to the cam shaft 90 and has the push rod 158 in contact therewith, either directly or with a valve lifter 162 therebetween.

Although air compressor 16 has been described as such, two valves are required to have the air compressor function. The air inlet valve 170 is retained in the normally closed position by a light spring 172. Valve 170 maintains the air inlet port 174 of compressor 16 in the normally closed position, but the valve is capable of being suction opened. Several configurations of the valve may be adapted, with the preferred configuration shown in FIGURE 1 and including a structural support 176 in pipe 44 and forming a seat for spring 172 as well as a guide for the stem of valve 170. Air is discharged through the pressure opened valve 180 which, like valve 170, is carried by end wall 184 of the barrel 96. Valve 180 has a valve stem 186 reciprocably disposed in guide and support structure 188 in pipe 190 to which air conductor 48 is secured. A light spring 192 is seated on the guide and support structure 188 and on the head of the valve, lightly retaining the valve in the air compressor exhaust port 193 closed position. On the compression stroke of the air compressor, valve 180 is opened permitting the air under pressure to rush through port 193, and air conductor 48.

Oil pump 18 also has two valves. The oil inlet valve 200 consists of a valve element, for instance ball 202 held captive in valve cage 204 within pipe 206. The valve cage is constructed with an inner valve seat and an outer valve seat, while pipe 206 has oil conductor 42 connected with it. When the pump piston 98 undergoes a pressure stroke, the valve element or ball 202 becomes located on seat 208 thereby closing valve 200. During the suction stroke of piston 98, ball 202 becomes unseated from seat 208 and clings by the rush of oil into cylinder barrel 102 onto seat 210 around which there are openings 212 to permit oil to flow freely into the barrel 102. The valve 200 is in the end wall 214 of the pump barrel as is the suction closed valve 218. This valve is constructed essentially the same as valve 200 but is arranged to close when the oil pump is undergoing a suction stroke and to open when the oil pump is undergoing a compression stroke, at which time oil flows past the valve element of valve 218 and enters pipe 222 that supports the valve 218. The pipe 222 has oil conductor 24 connected with it whereby the closed hydraulic circuit 20 is connected respectively with the inlet and outlet ports of pump 18.

The power delivered to turbine 22 or any other power consuming device connected in the hydraulic circuit 20, is controlled by valves located between the oil flow regulator 28 and the oil reservoir 26. Furthermore, although the system described herein is principally for the purpose of hydraulic actuation of a power consuming device in the closed hydraulic circuit 20, power may be taken off from crankshaft 90 and in any of the conventional power take-off mechanisms that are commercially available.

The piston design may be used with present combustion engines. In this case, one sub-piston could be used as an air compressor and the other as an oil pump; or both as an oil pump with an outside compressor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power generating system comprising, fuel combustion chamber means, power piston means operatively exposed to said combustion chamber means for absorbing energy released therein, fluid pressurized motor means, fluid pump means mechanically driven by said power piston means and operatively connected to said motor means for discharging pressurized fluid to the motor means, and fluid compressor means mechanically driven by the power piston means and operatively connected to the fluid pump means and combustion chamber means for respectively pressurizing inlet fluid to the fluid pump means and supplying fuel mixing fluid to the combustion chamber means, said combustion chamber means being defined by cylinder means within which said power piston means is slidable, said cylinder means also defining a pair of separate parallel fluid chambers within which the pump means and compressor means are located, and cam actuating means driven by the power piston means through linkage means disposed between the parallel fluid chambers for controlling fuel and air supply to said combustion chamber means.

2. A power generating system comprising, fuel combustion chamber means, power piston means operatively exposed to said combustion chamber means for absorbing energy released therein, fluid pressurized motor means, fluid pump means mechanically driven by said power piston means and operatively connected to said motor means for discharging pressurized fluid to the motor means, and fluid compressor means mechanically driven by the power piston means and operatively connected to the fluid pump means and combustion chamber means for respectively pressurizing inlet fluid to the fluid pump means and supplying fuel mixing fluid to the combustion chamber means, and valve means operatively connected to the combustion chamber means for controlling fluid flow to the combustion chamber means, valve cam actuating means mechanically driven by the power piston means for sequential actuation of the valve means.

3. The combination of claim 2 including cylinder means defining said combustion chamber means within which said power piston means is slidable and also defining a pair of separate parallel fluid chambers within which the pump means and compressor means are located, said cam actuating means being driven by the power piston means through linkage means disposed between the parallel fluid chambers for controlling fuel and air supply to said combustion chamber means.

References Cited in the file of this patent

UNITED STATES PATENTS

| | | |
|---|---|---|
| 2,391,972 | Hufford et al. | Jan. 1, 1946 |
| 2,793,594 | Goncalves | May 28, 1957 |
| 2,863,426 | Summerlin | Dec. 9, 1958 |
| 2,872,778 | Dane | Feb. 10, 1959 |
| 2,914,909 | Kubik | Dec. 1, 1959 |